F. NAGEL.
FOLDED FILTER.
APPLICATION FILED MAR. 29, 1913.

1,074,008.

Patented Sept. 23, 1913.

Witnesses

Inventor
Friedrich Nagel,
by
James L. Norris,
Attorney.

UNITED STATES PATENT OFFICE.

FRIEDRICH NAGEL, OF DÜREN, GERMANY.

FOLDED FILTER.

1,074,008.	Specification of Letters Patent.	Patented Sept. 23, 1913.

Application filed March 29, 1913. Serial No. 757,698.

*To all whom it may concern:*

Be it known that I, FRIEDRICH NAGEL, manufacturer, citizen of the Kingdom of Prussia, Empire of Germany, residing at Düren, Rhine Province, Germany, have invented certain new and useful Improvements in Folded Filters, of which the following is a specification.

My invention relates to improvements in folded filters for filtering liquids.

In filters which are folded from a blank the weakest part is the point where the creases of the folds meet. In filtering this point is subject to the highest liquid pressure, so that it is easily torn.

The object of the improvements is to provide a filter which is weakened by the creases in a less degree, so that it is more durable in use.
With this object in view my invention consists in making a filter in which the creases formed by the folds of the filter extend from the outer margin of the filter to points away from the center of the blank, so that in the folded filter the lowermost part is not in the form of a point, but in the form of a surface. By reason of the improved form of the filter the substances which have been filtered out of the liquid can more easily be removed, because they are deposited on the horizontal smooth bottom of the filter.

For the purpose of explaining the invention two examples embodying the same have been shown in the accompanying drawing, in which the same letters of reference have been used in all the views to indicate corresponding parts.

Figure 1:
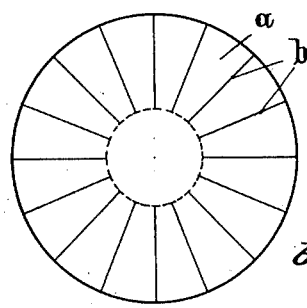
Figure 3:
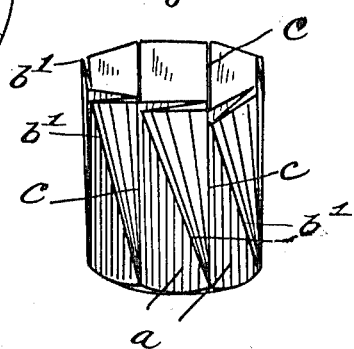
Figure 2:
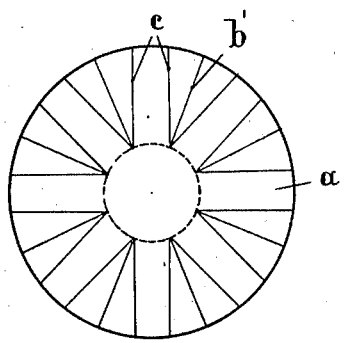

In said drawing Figure 1, is a plan view of the blank with the creases provided by the folds indicated thereon; Fig. 2, is a similar view illustrating a modification of the filter; and Fig. 3 is a perspective view of a filter folded from the blank shown in Fig. 2.

The filter shown in Fig. 1 is made from a circular blank *a* of a suitable filtering material, such for example as paper. On the blank radially-disposed creases *b* have been indicated which extend from the outer margin of the blank to points away from the center of the blank, and in the example shown the inner ends of the creases are on a circle which is concentric to the outer margin of the blank.

The example illustrated in Fig. 2 is similar to that shown in Fig. 1, but between adjacent radial creases *b'* are disposed pairs of parallel creases *c*.

My improved filter may be folded together at its upper margin, so that it assumes a cylindrical or substantially cylindrical form. Such a filter can advantageously be used in extraction apparatus, such for example as Soxhlet apparatus.

I claim herein as my invention:

1. As a new article of manufacture, a foldable circular filter blank having a plane central portion and creases extending inwardly from its outer marginal edge to the marginal edge of such portion.

2. A substantially cylindrical filter folded from a blank which has radial creases therein, and pairs of parallel creases disposed between adjacent radial creases.

In testimony whereof I have hereunto set my hand in presence of two subscribing witnesses.

FRIEDRICH NAGEL.

Witnesses:
  LOUIS VANDORY,
  BESSIE F. DUNLAP.